US006296458B1

(12) United States Patent
Zacher et al.

(10) Patent No.: US 6,296,458 B1
(45) Date of Patent: Oct. 2, 2001

(54) ELECTRIC FUEL PUMP

(75) Inventors: Wolfgang Zacher; Ronald Rathke, both of Döbein (DE)

(73) Assignee: Pierburg AG, Neuss (DE)

( * ) Notice: Subject to any disclaimer, the term of this patent is extended or adjusted under 35 U.S.C. 154(b) by 0 days.

(21) Appl. No.: 09/491,541

(22) Filed: Jan. 26, 2000

(30) Foreign Application Priority Data

Feb. 3, 1999 (DE) ............................................. 199 04 162

(51) Int. Cl.[7] ........................................................ F04B 17/00
(52) U.S. Cl. ............................................................... 417/366
(58) Field of Search ................................... 417/366, 321, 417/357, 371, 410.1, 423.1, 203

(56) References Cited

U.S. PATENT DOCUMENTS

| 3,600,601 | * | 8/1971 | Ayres | 307/118 |
|---|---|---|---|---|
| 5,231,967 | * | 8/1993 | Baltz et al. | 123/497 |
| 5,278,468 | * | 1/1994 | Escaravage et al. | 310/71 |
| 5,345,124 | * | 9/1994 | Lang | 310/51 |
| 5,421,706 | * | 6/1995 | Martin, Sr. | 417/371 |
| 5,454,697 | | 10/1995 | Nakanishi . | |
| 5,697,769 | * | 12/1997 | Kobman et al. | 417/410.1 |
| 5,785,013 | | 7/1998 | Sinn et al. . | |
| 5,908,286 | * | 6/1999 | Clemmons | 417/44.2 |
| 5,960,775 | * | 10/1999 | Tuckey | 123/509 |
| 5,997,262 | * | 12/1999 | Finkbeiner et al. | 417/410.4 |
| 6,106,240 | * | 8/2000 | Fischer et al. | 417/203 |
| 6,135,730 | * | 10/2000 | Yoshioka | 417/423.1 |

FOREIGN PATENT DOCUMENTS

| 3423316 | 1/1986 | (DE) . |
|---|---|---|
| 4222394 | 12/1993 | (DE) . |
| 4309382 | 9/1994 | (DE) . |
| 4331803 | 3/1995 | (DE) . |
| 19545561 | 6/1997 | (DE) . |

* cited by examiner

*Primary Examiner*—Teresa Walberg
*Assistant Examiner*—Vinod D Patel
(74) *Attorney, Agent, or Firm*—Ladas & Parry

(57) ABSTRACT

An electric fuel pump for an internal combustion engine in which a pump mechanism is provided in a housing for pumping fuel from an inlet to an outlet of the housing. A d.c. motor in the housing is drivingly connected to the pump mechanism, the fuel flowing through the housing past the motor to the outlet. A module including a commutation circuit for the d.c. motor is sealed in the housing from the fuel which flows therearound and cools the module. The module is constructed with an injection-molded casing around the circuit which is connected to stator windings of the motor and to an outside power supply.

12 Claims, 5 Drawing Sheets

ELECTRIC FUEL PUMP

FIELD OF THE INVENTION

The invention relates to electric fuel pumps for internal combustion engines.

BACKGROUND AND PRIOR ART

Such electric fuel pumps have long been known, and are frequently provided with a mechanically commutated direct-current motor.

There are also known pumps which are driven by an electronically commutated direct-current motor, although they are used only for pumping cooling water and similar liquids and are referred to as "canned" pumps (German Patent Application DE 195 45 561 A1). The main purpose of the "can" is to seal the pump compartment from the outside.

In German Patent Application DE 42 22 394 A1 there is shown a pump-motor unit in which a cooling wall is provided between the pump mechanism and the drive motor and at the cooling wall there is disposed means for cooling at least one power part of a speed controller of the motor.

In German Patent Application DE 43 31 803 A1 there is shown an electronically commutated electric motor for the drive of a liquid feed pump, with means for holding the permanent magnets around the rotor. Therein, the current leads connected to the stator winding can be connected to an electronic commutation device, which is not mounted directly on the electric motor and is external to the electric pump.

There exists a need, however, for fuel pumps which can be driven by electronically commutated direct-current motors, and which overcome the problems presently preventing widespread use.

SUMMARY OF THE INVENTION

An object of the invention is to provide means by which an electric fuel pump having a motor with electronic commutation can be operated and manufactured without problems.

In accordance with the invention, an electric fuel pump for an internal combustion engine is provided which comprises a housing, a pump mechanism in said housing for pumping fluid from an inlet to an outlet of said housing and a d.c. motor, in said housing drivingly connected to said pump mechanism. The fuel flows through said housing from the inlet past the motor to said outlet. A module including a commutation circuit for said d.c. motor is connected to said motor and is sealed in said housing from the fuel flowing therethrough.

DETAILED DESCRIPTION

Figure 1:
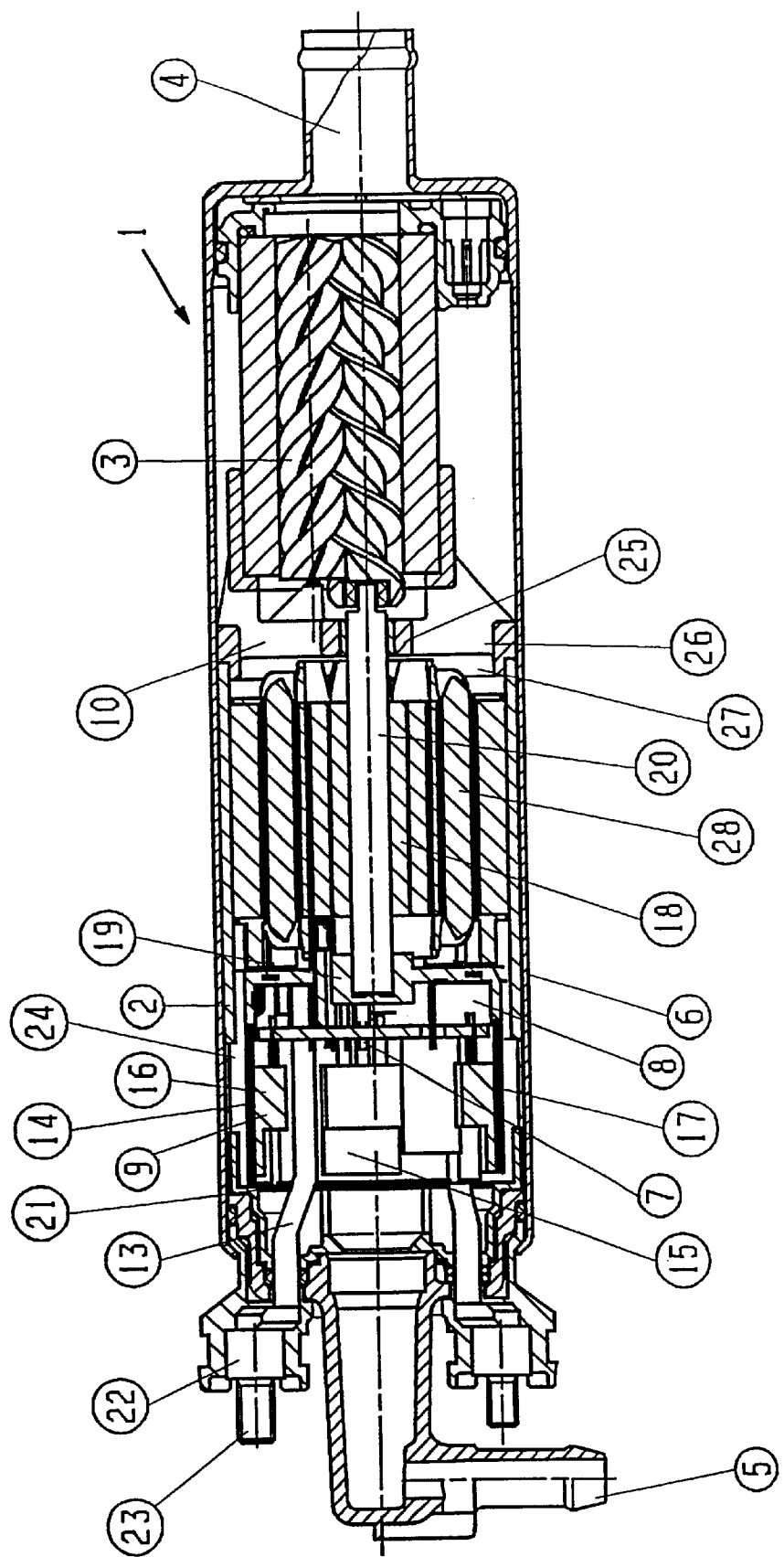
FIG. 1 is a sectional view of an electric fuel pump according to the invention.

FIG. 1 shows an electric fuel pump I suitable for pumping fuel to an internal combustion engine (not shown). The pump 1 comprises an electronically commutated direct-current motor 2 and a pump mechanism 3, disposed together in a housing 6. The housing has a suction inlet 4 for fuel and a pressure outlet 5 for delivery of the pumped fuel. The fuel flows in the housing 6 from the pump mechanism 3 around the motor 2.

The motor 2 is provided with a commutation circuit 7 disposed in a motor compartment 8. The commutation circuit 7 is part of an electronic module 9 which is sealed in a compartment 10 from fuel flowing in the housing.

Thereby, reliable sealing is achieved of the electronic components from the aggressive fuel. Moveover, the fuel flowing around motor compartment 8 cools the electronic components, by removing the heat dissipated therefrom. This cooling provision is also favorable for the pole windings, which can also be in contact with the cooling fuel, which was not possible heretofore.

Figure 2:
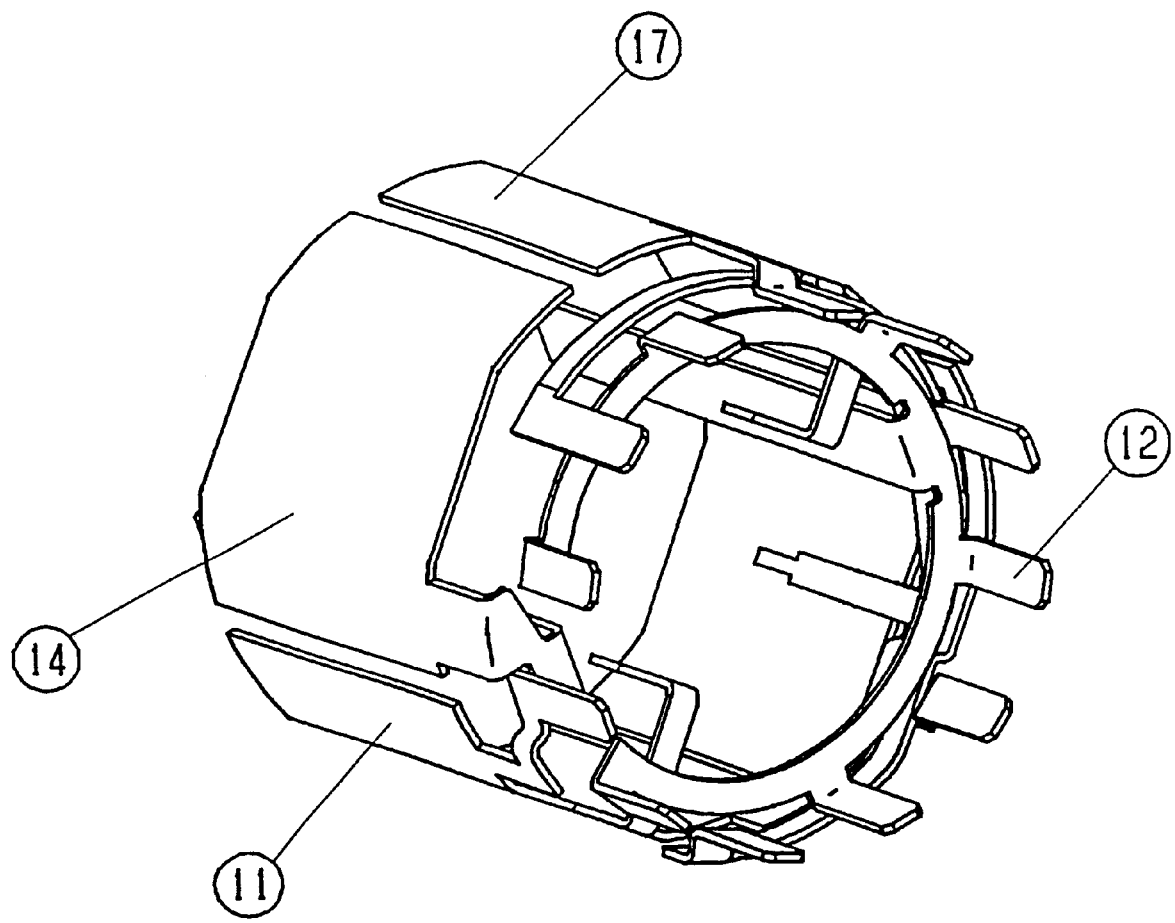
FIG. 2 is a perspective view, partially broken away showing one end of an electronic module in the electric fuel pump in FIG. 1.
Figure 3:
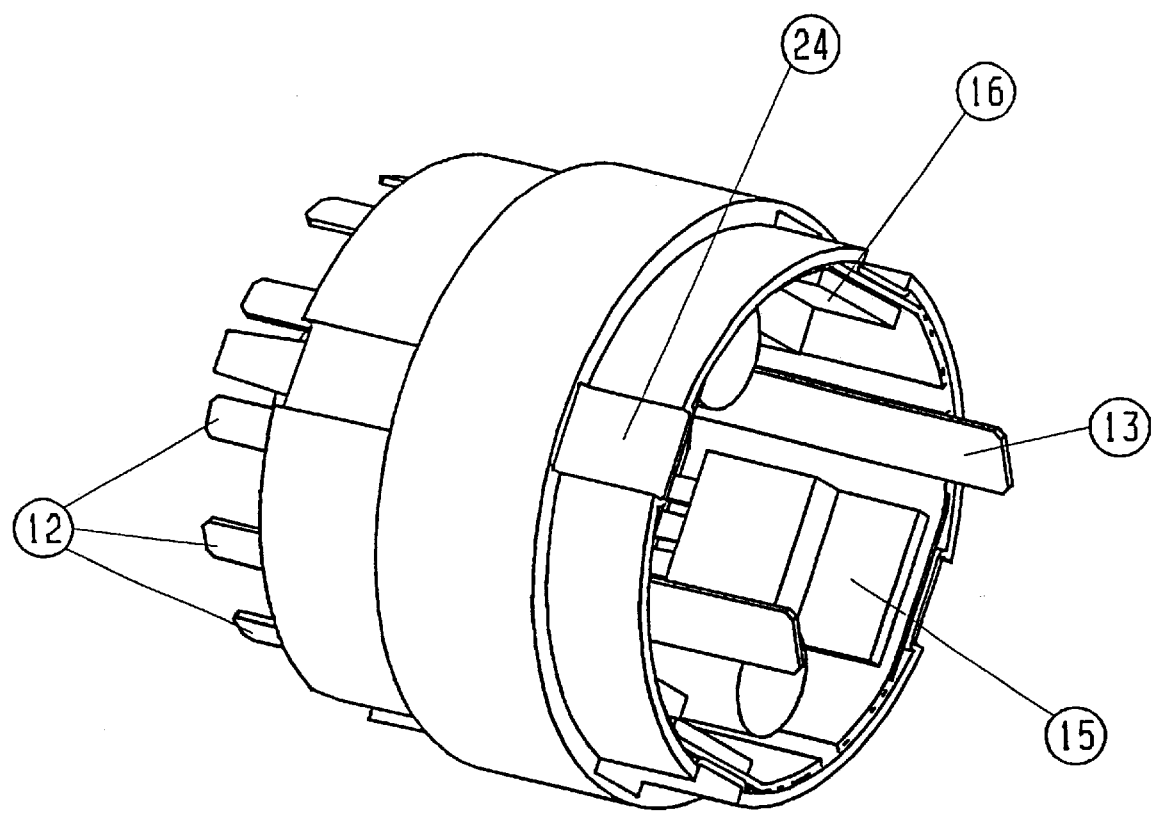
FIG. 3 is a perspective view of the electronic module in FIG. 2 seen from the opposite end thereof.

The electronic module 9 comprises an injection-molded plastic casing 11 (illustrated in FIGS. 2 and 3), from which insertable terminals 12 and motor-connection contacts 13 project out of the plastic casing 11. Casing 11 is formed with wings 14 serving as cooling elements to remove heat developed by components 15, 16 of the electronic power unit of commutation circuit 7. The wings 14 are joined to casing 11 and extend circumferentially in radially spaced relation around the casing 11. The external surfaces of the wings 14 are covered by a thin plastic layer and the outer surfaces 17 of the wings are communicated to the fuel-conducting compartment 10, as illustrated in FIG. 1.

Increased heat removal from components 15, 16 is effected by the wings 14 as will be explained in greater detail later. Electronic module 9 has an end portion 19 facing a rotor shaft 20 of an internal rotor 18 of the motor 2. The end portion 19 supports one end of the rotor shaft 20. At its opposite end, the end portion 19 is closed and sealed in the motor compartment 8 by a compartment cover 21.

Hereby, a simple structural design is achieved. Sealed motor-connection contact elements 13 project through compartment cover 21 and are connected in fuel-conveying compartment 10 to internal portions 22 of terminal pins 23, which project out of housing 6 for connection to an electrical power source (not shown).

Electronic module 9 is formed with cooling ducts 24 at its external surface by wings 14, through which ducts fuel flows at high velocity. Thereby heat dissipation is additionally increased.

The rotor shaft 20 is supported at its opposite end in a pump compartment 25, which contains pump mechanism 3. The compartment 25 is provided with apertures 26 through which fuel is pumped into a multipole stator compartment 27, which is in communication at the other end with cooling ducts 24. This arrangement also permits a reduction in the number of components.

Figure 4:
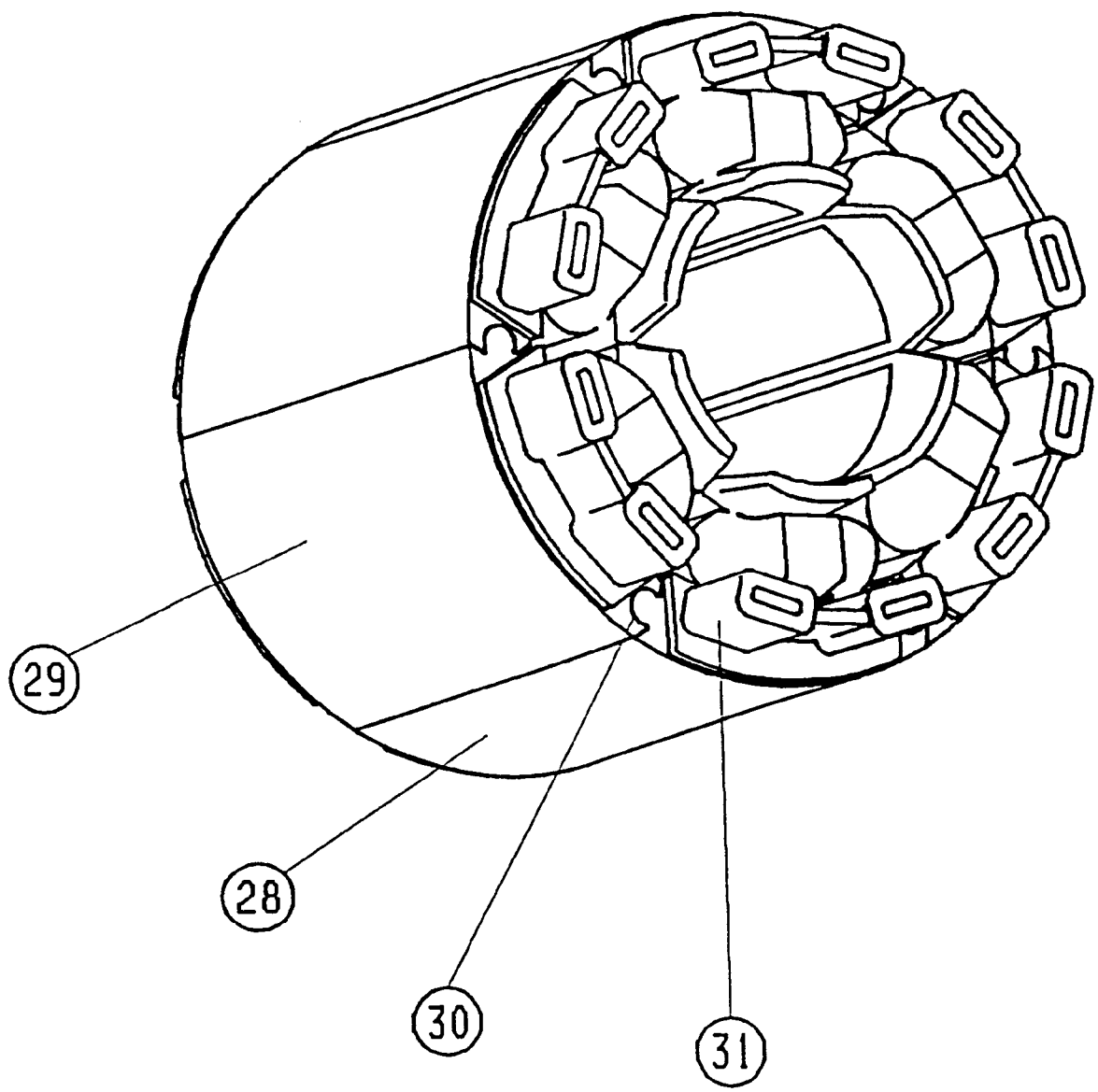
FIG. 4 is a perspective view showing an end of a multipole stator of the motor in FIG. 1.
Figure 5:
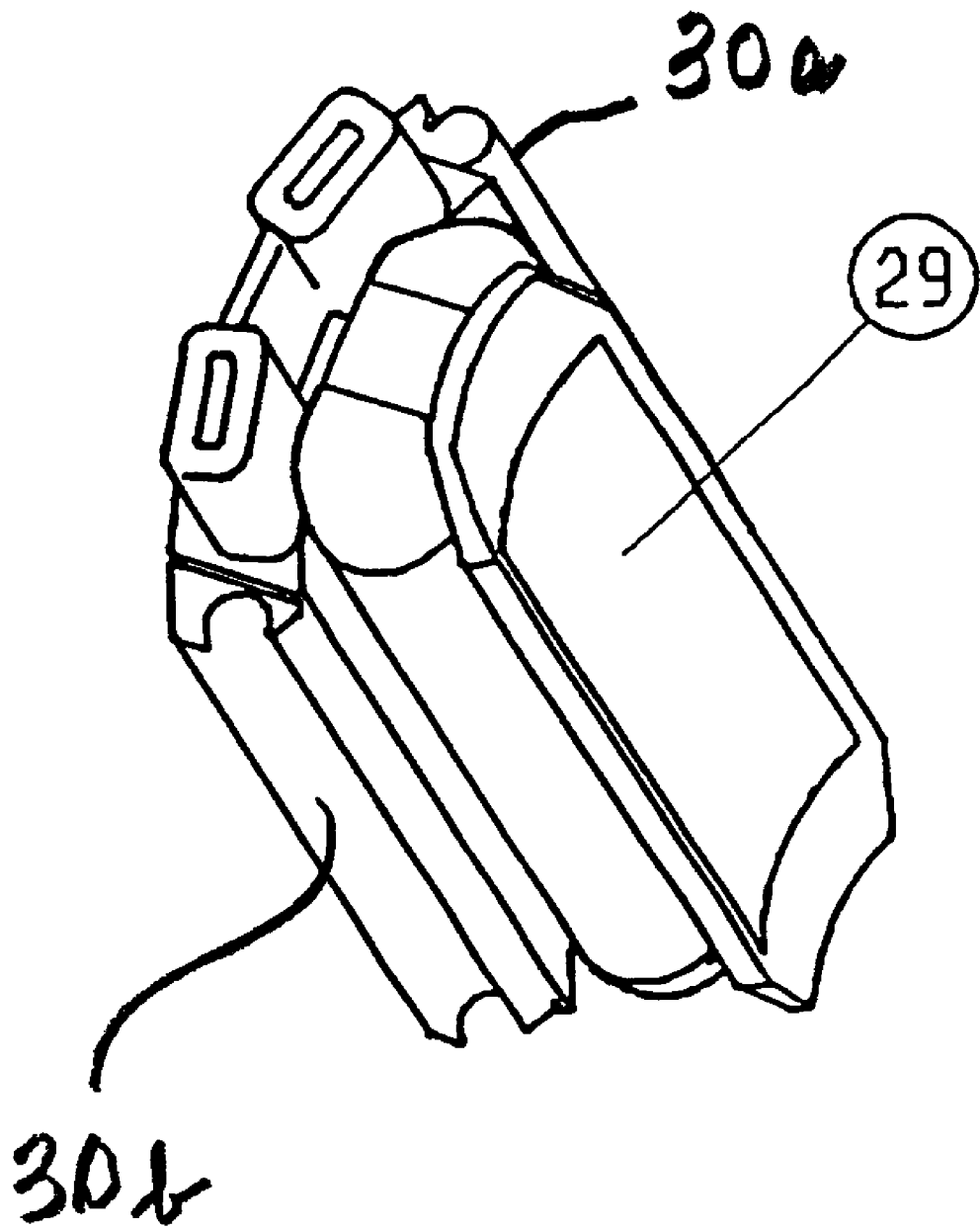
FIG. 5 shows in perspective a ring segment with winding of the stator.

The multipole stator 28 comprises a plurality of identical segments 29 (FIGS. 4 and 5), the number of which corresponds to the number of poles. The segments 29 are joined together by an interlocking engagement of a projection 30$a$ at the side edge of one ring segment in a groove 30$b$ at the side edge of an adjacent segment. The ring segments 29 are provided with sockets 31 for receiving connection terminals of the windings. The sockets 31 are molded in a plastic housing of the ring segments and receive the winding leads 12 projecting from electronic module 9. Thereby an advantageous and inexpensive assembly is achieved.

During operation of the electric fuel pump 1, the pump mechanism 3 is driven and fuel is sucked into the housing at inlet 4, where it then passes through the pump compartment into compartment 10, and then via perforations 26 into the multipole stator compartment 28 and then via cooling ducts 24 to outlet port 5.

Along this path through the electric fuel pump 1, all heat pockets that may develop in housing 6 or in housing compartment 10 are sufficiently cooled.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. An electric fuel pump for an internal combustion engine comprising a housing, a pump mechanism in said housing for pumping fuel from an inlet to an outlet of said housing, a d.c. motor in said housing drivingly connected to said pump mechanism, the fuel flowing through said housing past the motor to said outlet, a module including a commutation circuit for said d.c. motor, said module being connected to stator windings of said motor and sealed in said housing from the fuel flowing therethrough, said module comprising an injection-molded plastic casing having motor connection contact elements and power connecting terminals projecting from said casing, said housing having a compartment through which fuel flows past said casing, said casing having an outer surface exposed to the fuel flowing in said compartment so as to be cooled by the fuel, said outer surface of the casing having cooling elements thereon exposed to the fuel flowing in the housing compartment.

2. An electric fuel pump as claimed in claim 1, wherein said cooling elements comprise a plurality of wings connected to said outer surface of the casing and extending therearound in spaced relation to define a passage for flow of the fuel to cool said module.

3. An electric fuel pump as claimed in claim 2, wherein said wings extend circumferentially around said casing in radially spaced relation from said outer surface thereof.

4. An electric fuel pump as claimed in claim 2, wherein said motor connection contact elements and said power connecting terminals project from opposite ends of said casing.

5. An electric fuel pump as claimed in claim 1, wherein said casing rotatably supports a shaft of a rotor of the motor and includes an end portion thereat which is closed and sealed.

6. An electric fuel pump as claimed in claim 5, comprising a cover at said end portion of said casing.

7. An electric fuel pump as claimed in claim 5, wherein said power connection elements project from said casing at said end portion, said fuel pump further comprising terminal pins having internal portions connected to said power connection elements, said terminal pins extending from said housing for connection to an outside power supply.

8. An electric fuel pump as claimed in claim 5, wherein said outer surface of the casing is provided with cooling ducts therearound through which fuel can flow to cool the module.

9. An electronic fuel pump as claimed in claim 8, wherein said pump mechanism has apertures through which fuel can flow into said compartment and through a stator of the motor and around said casing.

10. An electric fuel pump as claimed in claim 9, wherein said stator comprises a plurality of segments joined together interlocking manner, each segment having one side with a projection thereat and an opposite side with a groove therein such that the projection of one said segment can interlock in the groove of an adjacent said segment.

11. An electric fuel pump as claimed in claim 10, wherein each segment has a socket for receiving a corresponding one of said motor connection contact elements projecting from said casing.

12. An electric fuel pump as claimed in claim 5, wherein said pump mechanism includes a portion rotatably supporting said shaft of the rotor at an end thereof opposite the end rotatably supported by the casing.

* * * * *